United States Patent [19]

Warshawsky et al.

[11] Patent Number: 5,560,541

[45] Date of Patent: Oct. 1, 1996

[54] ANTI-SCALD VALVE FOR BATHROOM SHOWERS

[75] Inventors: Jerome Warshawsky, Hewlett Harbor; Frank Antoniello, Commack; Alexandru Maxim, Farmingdale, all of N.Y.

[73] Assignee: I.W. Industries, Inc., Melville, N.Y.

[21] Appl. No.: 430,727

[22] Filed: Apr. 28, 1995

[51] Int. Cl.⁶ .................................................. G05D 23/12
[52] U.S. Cl. .......................... 236/93 B; 137/457; 236/100
[58] Field of Search ............................... 236/93 B, 93 A, 236/100, 99 K; 137/457, 462

[56] References Cited

U.S. PATENT DOCUMENTS

| | | | |
|---|---|---|---|
| 2,556,777 | 6/1951 | Reimuller | 236/93 BX |
| 3,038,664 | 6/1962 | Gould | 236/93 BX |
| 3,263,926 | 8/1966 | Couffer et al. | 236/93 BX |
| 4,180,208 | 12/1979 | Obermaier | 236/93 B |
| 4,281,790 | 8/1981 | McGinnis | 236/93 B |
| 4,515,213 | 5/1985 | Rogen | 166/123 |
| 4,619,320 | 10/1986 | Adnyana | 166/65.1 |
| 4,637,427 | 1/1987 | Nolan et al. | 137/462 X |
| 4,778,104 | 10/1988 | Fisher | 236/80 R |
| 4,840,346 | 6/1989 | Adnyana | 251/1.3 |
| 4,848,388 | 7/1989 | Waldbusser | 137/80 |
| 4,969,598 | 11/1990 | Garris | 236/12.12 |
| 5,123,593 | 6/1992 | Rundle | 236/93 B |
| 5,259,554 | 11/1993 | Ewing | 236/87 |

FOREIGN PATENT DOCUMENTS

| | | | |
|---|---|---|---|
| 525020 | 8/1940 | United Kingdom | 137/462 |
| 1184720 | 3/1970 | United Kingdom | 137/462 |
| 2203791 | 10/1988 | United Kingdom. | |
| WO92/14083 | 8/1992 | WIPO. | |
| WO93/07636 | 4/1993 | WIPO. | |

OTHER PUBLICATIONS

"Scaldsafe™", Resources Conservation, Inc. of Greenwich, CT 06830.

"Memrysafe®" and "Flowgard®", Memry Corp., Brookfield CT.

*Primary Examiner*—William E. Tapolcai
*Attorney, Agent, or Firm*—Alfred M. Walker

[57] ABSTRACT

A hot water shut off valve for use for domestic household water shower use which shuts off excessively hot water. The valve generally includes an water inlet source opening to an inner chamber. The inner chamber has an outlet source at the base of said chamber, a sealing means communicating with said outlet sources for alternately turning on or off the flow of water from said inlet sources through said outlet sources. The sealing means is urged against the base of said mixing chamber by means of a paraffin power element communicating with a spring. In the preferred embodiment, a reset member is provided to reset the flow of warm water from the inlet source to the outlet source.

4 Claims, 1 Drawing Sheet

ANTI-SCALD VALVE FOR BATHROOM SHOWERS

FIELD OF THE INVENTION

The present invention relates to an emergency shut off valve apparatus, and, more particularly, for use in bathroom showers.

There is a possibility for serious damage to occur in showers where the water will rise in temperature above a safe level, wherein the person risks scald burns and scars therefrom at an unsafe water temperature above 120° F.

BACKGROUND OF THE INVENTION

Prior valves describe temperature control valves which use bimetallic or other expandable coil springs for temperature control. Among these patents are U.S. Pat. No. 5,123,593 of Rundle, which describes a manual override heat sensitive valve, U.S. Pat. No. 4,619,320 of Adnyana which describes a subsurface well safety valve and control system, U.S. Pat. No. 4,840,346 also of Adnyana which describes an apparatus for sealing a well blowout, U.S. Pat. No. 4,778,104 of Fisher, which describes a temperature responsive line valve, U.S. Pat. No. 4,848,388 of Waldbusser, which describes an emergency valve with test capabilities, U.S. Pat. No. 4,969,598 of Garris, which describes a control valve, U.S. Pat. No. 4,515,213 of Rogen, which describes a packing tool apparatus for sealing well bores, U.S. Pat. No. 5,259,554 of Ewing which describes a temperature responsive pilot operated line valve with a shape memory alloy actuator, United Kingdom Patent no. GB 2,203,791A of Michael which describes a securing device, PCT WO 92/14083 of Gordon which describes an emergency valve and PCT WO 93/07636 of Powell which describes a shape memory device.

Typical related-prior art devices having coil spring shape metal elements therein are manufactured by Resources Conservation, Inc. of Greenwich, Conn. 06830 under the tradename of SCALDSAFE™ and by Memry Corp. of Brookfield, Conn. under the tradenames of MEMRYSAFE® and FLOWGARD®.

In summary, with respect to related temperature controlled water valves, the temperature control valves in the related prior art devices are usually continuously controlled by a bimetallic shape metal element coil spring, which expands under a predetermined temperature range when they are actuated, so that the hot water stops flowing. Also, the aforementioned patents discloses valves which can be actuated by an increase in heat so that the safety shut off feature of the valve is actuated. However, because of the temperature responsive shape metal element coil spring, the prior art patents shut off at a safe temperature which may be too low for optional comfort, such as below 110° F. Therefore, one cannot use these prior art patents to achieve a hot, but safe, water temperature of 115° F.

The prior art in technologies unrelated to domestic showers also includes heat responsive power elements, which include sealed cavities having an expandable waxy substance composition consisting essentially of paraffin and a metal such as copper. These power elements are used primarily in machinery thermostats, such as in metal bath preparations or for motor vehicle engines, or to control hydraulic fuel temperatures in aircraft valves.

OBJECTS OF THE INVENTION

Accordingly, it is an object of the present invention to provide such a domestic shower hot water valve which has a shut off mechanism so that hot water supply is shut off at a predetermined hot temperature.

It is yet a further object of the present invention to provide a domestic shower hot water valve which maintains adequate shower water temperature over a desired period of time.

It is yet another object of the present invention to provide a domestic shower hot water valve in which, after activation of the valve due to high ambient temperature, the valve can be manually reset.

It is a further object to provide a shower hot water shut off valve which improves over the disadvantages of the prior art.

SUMMARY OF THE INVENTION

In keeping with these objects and others which may become apparent, the present invention provides a quick self-actuating ambient temperature responsive shower hot water anti-scald shut off valve, for use with a domestic hot water shower fluid line. The valve includes a hollow body having a flow path therethrough, a valve seat in the flow path, for interrupting the fluid flow, a shut off element spaced apart from the valve seat and movable to a water shut off position at the valve seat, to interrupt flow of hot water through and along the flow path, and a power element for moving the shut off element to the valve seat when the hot water temperature at the valve increases above a predetermined unsafe level. The power element can be overridden by a reset mechanism. The reset mechanism includes a piston which engages the fluid flow path upstream of the power element. The hot water shut off valve is arranged so that the valve can be manually activated when an expandable composition consisting essentially of a paraffin wax and a metal within the power element is activated to the predetermined, high temperature. Expansion of the composition causes a pin to move the power element to close off the flow of hot water.

After the power element has actuated the safety feature of the valve, i.e., the valve has been exposed to an ambient temperature higher than that for which it is set, and it has shut off, the supply of hot water is shut off. The valve can be manually reset when the ambient temperature is lowered to below the temperature for which it is set.

The bypass valve mechanism can be actuated when the sealed power element is seated on the valve seat. The user manually readjusts the flow to cooler water, by adjusting the user's conventional cold and hot shower water handles to permit a flow of cooler water into the valve housing through the water inlet. To permit the cooler water into the chamber to open up the valve seat, the piston is depressed to open up the flow of the cooler water through the bypass conduit into the chamber having the sealed power element therein.

DESCRIPTION OF THE DRAWINGS

Other objects, features, and advantages will be apparent from the following detailed description of preferred embodiments taken in conjunction with the accompanying drawing in which.

DETAILED DESCRIPTION OF THE PREFERRED EMBODIMENTS

Figure 1:
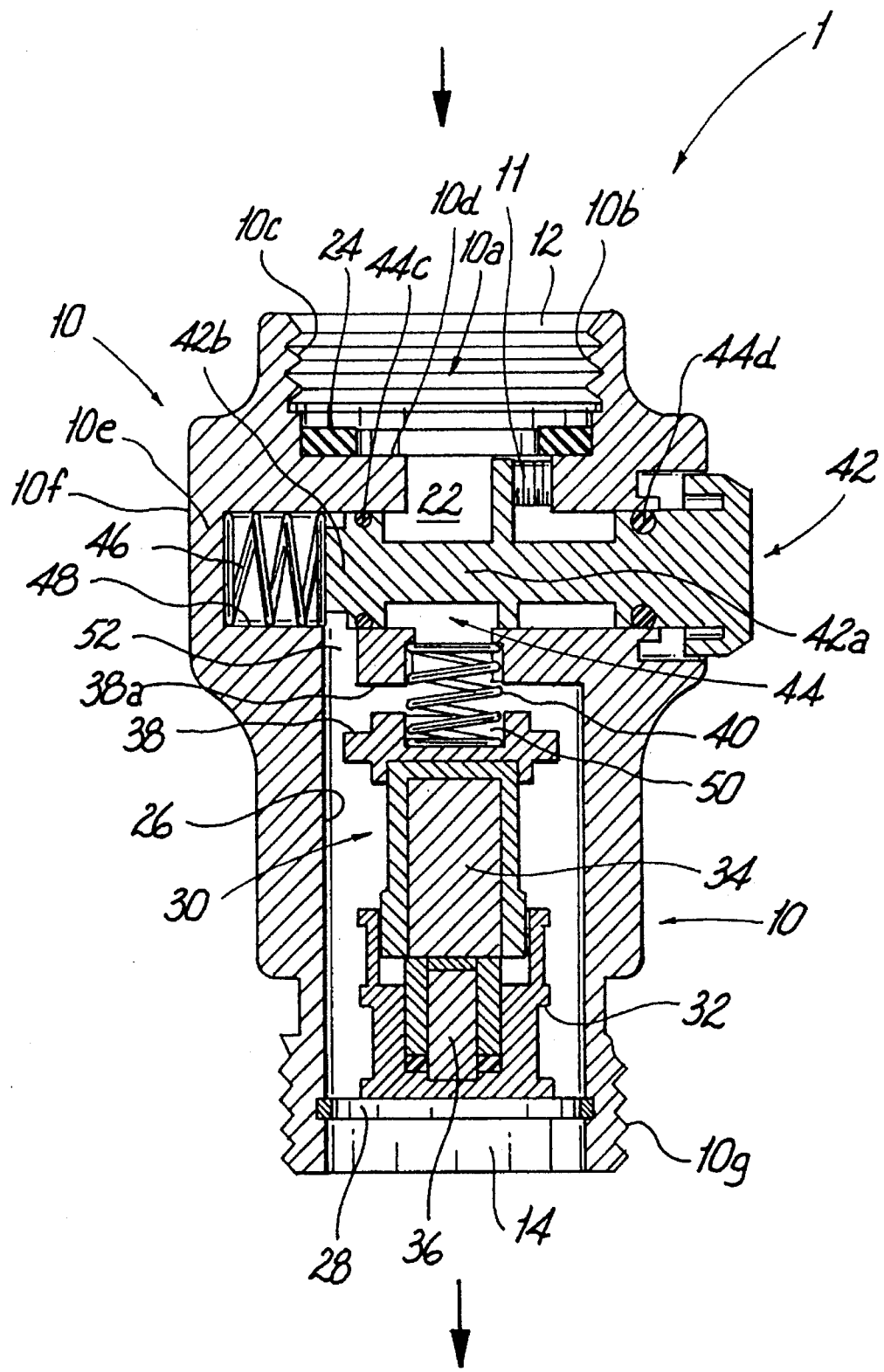
FIG. 1 is a side cross sectional view of the shower hot water shut off valve.

As shown in FIG. 1, shower hot water shut off valve 1 is shown in the open position, having housing body 10 which has an upper water inlet 12, a lower outlet 14 and a movable sealing element, such as sealed power element 30, therebetween to prevent scalding by excessively hot water in a domestic shower.

At the upper end of the valve housing body 10 is a large bore 22 with a gasket 24 as shown in FIG. 1. The hot water fluid passes through bore 22 to chamber 26 in the fluid line, which flows in the direction shown by the arrows in FIG. 1. Set screw 11 acts as a fastening means for piston 42 to prevent piston 42 from ejecting from valve housing body 10.

Outlet 14 has a spring loaded coiled snap ring 28, preferably of beryllium copper, to adjust tension when power element 30 moves within power element guide 32. Power element 30 has reservoir 34 containing a temperature responsive composition consisting of paraffin wax and a metal, such as copper, therein.

When the paraffin based composition is exposed to a rise in heat temperature, the composition expands against pin 36 at a lower portion of power element 30, thereby causing pin 36 to move, which urges power element 30 to move within guide 32 against valve seat 38 at an upper portion of paraffin power element 30. Valve seat 38 is movable against a coil spring 40 toward valve seat face 38a.

To reset hot water flow through housing body 10, piston 42 moves perpendicular to the movement of power element 30 to open the hot water fluid flow.

At upper water inlet 12, housing body 10 includes recessed female threaded grooved recess 10a with threads 10b upon inner wall 10c, for engagement with a shower water line pipe connection. At the outlet end 14 of housing body 10 there is provided male threaded portion 10g.

To prevent leakage, bottom wall 10d of recess 10a is sealed with gasket 24. Bottom wall 10d is also provided with bore 22, through which bore 22 hot water passes into inner cavity 44, Inner cavity 44 houses transversely movable bypass piston 42 therein. To further prevent leakage, piston head 42b and piston stem 42a of manually operable bypass piston 42 are sealed with sealing means, such as O-rings 44c, 44d respectively.

Bypass piston is held in place by tensioning coil spring 46 within further inner cavity 48, so that piston 42 is axially aligned within inner cavities 44, 48 respectively.

In the open position, water passes from inner cavity 44, around piston stem 42a of piston 42 and through further bore 50, having coil spring 40 therein biased against seat 38. Also in the open position, seat 38 is spaced apart from seat face 38a, which seat face 38a is provided transverse to the direction of flow of water from inlet 12 to outlet 14.

Further in the open position, housing body 10 provides that water flow from inner cavity 44 into chamber 26, within which chamber 26 power element 30 is slidably movable within the confines of power element guide 32, in a direction axially opposite to, but parallel to, the hot water flow from inlet 12 to outlet 14.

Power element 30 shuts off water by closing inner cavity 44, therefore preventing the flow of hot water into chamber 26.

To manually reset the flow of water, piston 42 is manually depressed inward in a longitudinal direction axially within further inner cavity 48 toward wall 10e of housing body 10. In the open position, piston head 42b normally blocks flow of water through bypass conduit 52 provided between outer wall 10f of housing body 10 and seat face 38a.

However, in the closed position, piston head 42b is moved longitudinally within inner cavity 48 beyond bypass conduit 52, thereby opening bypass conduit 52 again and permitting the flow of cooler water from inlet 12 through bypass conduit 52 into chamber 26 and out of outlet end 14 of housing body 10, after the user manually adjusts the conventional hot and cold shower water handles.

Otherwise, if hot water had continued to flow into chamber 26, then power element 30 would continue to seal cavity 44 closed. If the user forgets to add cooler water, then coil spring 46 will readjust the position of piston 42 rearward so that piston head 42b re-closes bypass conduit 52.

TEST RESULTS

Tests were conducted by the Applicant to compare the prior art with the present invention as to effectiveness in sustaining comfortably warm water in a domestic shower, while being able to shut off automatically at predetermined threshold hot temperatures.

A prior art bimetallic coil spring anti-scald valve, manufactured by Resources Conversation, Inc. of Greenwich,, Conn. 06830 under the tradename "Scald Safe™" was tested and compared with the present invention. The prior art "Scald Safe™" is patented under U.S. Pat. No. 5,123,593 of Rundle, as noted in the discussion of the prior art herein.

As noted in the following Table I, both the prior art, device and the present invention were tested to achieve three different desired temperature levels of 105° F., 110° F. and 115° F. respectively. The devices were tested to shut down at a flow rate of less than 0.5 gallons per minute. As noted in Table I, the prior art device never achieved a stabilized desired temperature above 109° F. Therefore, even though in two out of three circumstances the desired stabilized temperature for the prior art device was 110° F. and 115° F., which are acceptably warm temperatures, the unit shut off prematurely before achieving these desired water temperatures.

In contrast to the prior art, the present invention was able to achieve the desired stabilized temperatures of 105° F., 110° F. and 115° F. respectively.

Moreover, the present invention was also effective in shutting down between 117° F. and 120° F. below the desired threshold temperature of 120° F.

In Table I, the prior art device is labelled as "prior art" and the present invention is labelled as "improved power element."

TABLE I

| TEMPERATURE SENSING METHOD | DESIRED SHOWER TEMP. (°F.) | STABILIZED TEMP. (°F.) | SHUTDOWN (LESS THAN 0.5 GPM) TEMP. (°F.) |
| --- | --- | --- | --- |
| Prior Art Bi Metallic Coil Spring | 105 | 105.0 | 112.6 |
| Prior Art Bi Metallic Coil Spring | 110 | 107.8 | 107.9 |
|  |  | 107.0 | 107.7 |
|  |  | 109.0 | 115.0 |
|  |  | 106.0 | 109.4 |
|  | 115 | 105.0 | 112.6 |
| Improved Power Element | 105 | 105.0 | Between 117.0–120.0 |
| Improved Power Element | 110 | 110.0 | Between 117.0–120.0 |
| Improved Power Element | 115 | 115.0 | Between 117.0–120.0 |

Consequently the test results prove that the bimetallic coil spring based prior art device shut off at a safe temperature which may be too lukewarm and low for optional comfort, such as below 110° F. The bimetallic coil spring based prior art device is not able to flow at temperatures higher than 109° F. under any conditions. Also, as shown in Table I, the temperature varies from test to test on the same prior art device. As a result, the prior art device does not achieve a hot, but safe, desired water temperature of above 109° F., as the present invention does.

It will now be apparent to those skilled in the art that other embodiments, improvements, details, and uses can be made consistent with the letter and spirit of the foregoing disclosure and within the scope of this patent, which is limited only by the following claims.

I claim:

1. A self-actuating, domestic shower hot water shut off valve, for insertion in a shower fluid flow line, comprising:

a valve body having a flow path therethrough;

a valve seat in said flow path, said valve body having an inner cavity upstream of said valve seat through which said water flows;

power element means in a lower chamber downstream of and normally spaced from said valve seat to permit water flow through said valve body, spring means biasing said power element means away from said valve seat in the direction of water flow, said power element means comprising a sealed hollow chamber having an expandable, temperature responsive composition comprising a mixture of paraffin wax and a metal therein and having pin means responsive to pressure from said temperature responsive composition expanding as a result of hot water in said valve body being in exces of a predetermined temperature to move said power element means upstream ot contact said valve seat and terminating water flow through said valve body;

a conduit formed inn said valve body providing communication between said inner cavity and said lower chamber bypassing said valve seat and dpermitting the bypassed water flow to contact said power element means; and reset means comprising piston means movable transversely through said inner cavity and spring biased to block entry of water from said inner cavity to said conduit, said piston measn being manually operable to overcome the spring bias to incover entry into said contuit from said inner cavity thereby permitting a person taking a shower to resume water flow after said power element means contacts said valve seat and terminates water flow.

2. A hot water shut off valve as in claim 1, wherein said expandable composition in said power element means consists essentially of paraffin wax and copper.

3. The shower hot water shut off valve of claim 1 wherein said power element means slides within a stationary guide mounted in the lower chamber of said valve body.

4. The shower hot: water shut off valve of claim 3 wherein said piston means is located directly in the flow path of said water through said valve body.

* * * * *